US012272249B1

(12) United States Patent
Derginer et al.

(10) Patent No.: US 12,272,249 B1
(45) Date of Patent: *Apr. 8, 2025

(54) PROXIMITY SENSING SYSTEM AND METHOD FOR A MARINE VESSEL WITH AUTOMATED PROXIMITY SENSOR LOCATION ESTIMATION

(71) Applicant: Brunswick Corporation, Mettawa, IL (US)

(72) Inventors: Matthew E. Derginer, Butte des Mort, WI (US); Aaron J. Ward, Oshkosh, WI (US); Travis C. Malouf, Germantown, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,089

(22) Filed: Sep. 29, 2023

Related U.S. Application Data

(63) Continuation of application No. 17/873,567, filed on Jul. 26, 2022, now Pat. No. 11,816,994, which is a (Continued)

(51) Int. Cl.
*G08G 3/00* (2006.01)
*B63B 49/00* (2006.01)
(Continued)

(52) U.S. Cl.
CPC .............. *G08G 3/02* (2013.01); *B63B 49/00* (2013.01); *B63H 25/04* (2013.01); *G05D 1/0206* (2013.01); *B63H 2025/045* (2013.01)

(58) Field of Classification Search
CPC .......... G08G 3/02; B63B 49/00; B63H 25/04; B63H 2025/045; G05D 1/0206
(Continued)

(56) References Cited

U.S. PATENT DOCUMENTS 5,515,287 A  5/1996 Hakoyama et al.
6,234,100 B1  5/2001 Fadeley et al.
(Continued)

FOREIGN PATENT DOCUMENTS

CA  2279165  1/2001
CA  2282064  1/2001
(Continued)

OTHER PUBLICATIONS

W. Xu et al., "Internet of Vehicles in Big Data Era." in IEEE/CAA Journal of Automatica Sinica, vol. 5, No. 1, pp. 19-35, Jan. 2018, doi:10.1109/JAS.2017.7510736. (Year 2018).
(Continued)

*Primary Examiner* — Tiffany P Young
(74) *Attorney, Agent, or Firm* — Andrus Intellectual Property Law, LLP

(57) ABSTRACT

A proximity sensing system on a marine vessel includes a main IMU positioned on the vessel at a main installation attitude and a main location, a first proximity sensor configured to measure the proximity of objects from a first sensor location on the vessel, and a first sensor IMU positioned on the vessel at the first sensor location and at a first installation attitude. A control system is configured to receive main IMU data from the main IMU and first IMU data from the first sensor IMU, wherein the main location of the main IMU on the marine vessel is known and at least one of the first sensor location and the first installation attitude of the first sensor IMU on the marine vessel are initially unknown, and calibrate the proximity measurements from the first proximity sensor based on the main IMU data and the first IMU data.

20 Claims, 5 Drawing Sheets

Related U.S. Application Data continuation of application No. 16/674,889, filed on Nov. 5, 2019, now Pat. No. 11,436,927.

(60) Provisional application No. 62/770,499, filed on Nov. 21, 2018.

(51) Int. Cl.
  *B63H 25/04* (2006.01)
  *G05D 1/00* (2024.01)
  *G08G 3/02* (2006.01)

(58) Field of Classification Search
  USPC .................................................. 701/21
  See application file for complete search history.

(56) References Cited

U.S. PATENT DOCUMENTS

| | | |
|---|---|---|
| 6,273,771 B1 | 8/2001 | Buckley et al. |
| 7,267,068 B2 | 11/2007 | Bradley et al. |
| 7,725,253 B2 | 5/2010 | Foxlin |
| 8,195,381 B2 | 6/2012 | Arvidsson |
| 8,622,778 B2 | 1/2014 | Tyers et al. |
| 9,039,469 B1 | 5/2015 | Calamia et al. |
| 9,183,711 B2 | 11/2015 | Fiorini et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,778,657 B2 | 10/2017 | Tyers |
| 9,878,769 B2 | 1/2018 | Kinoshita et al. |
| 9,996,083 B2 | 1/2018 | Vojak |
| 9,908,605 B2 | 3/2018 | Hayashi et al. |
| 9,927,520 B1 | 3/2018 | Ward et al. |
| 9,988,134 B1 | 6/2018 | Gable et al. |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,126,748 B2 | 11/2018 | Akuzawa et al. |
| 10,191,153 B2 | 1/2019 | Gatland |
| 10,191,490 B2 | 1/2019 | Akuzawa et al. |
| 10,431,099 B2 | 1/2019 | Stewart et al. |
| 10,272,977 B2 | 4/2019 | Hashizume et al. |
| 10,281,917 B2 | 5/2019 | Tyers |
| 10,338,800 B2 | 7/2019 | Rivers et al. |
| 10,429,845 B2 | 10/2019 | Arbuckle et al. |
| 10,444,349 B2 | 10/2019 | Gatland |
| 10,507,899 B2 | 12/2019 | Imamura et al. |
| 10,746,552 B2 | 8/2020 | Hashizume et al. |
| 2003/0137445 A1 | 7/2003 | Rees et al. |
| 2005/0075016 A1 | 4/2005 | Bertetti et al. |
| 2006/0058929 A1 | 3/2006 | Fossen et al. |
| 2007/0089660 A1 | 4/2007 | Bradley et al. |
| 2011/0153125 A1 | 6/2011 | Arbuckle et al. |
| 2011/0172858 A1 | 7/2011 | Gustin et al. |
| 2014/0316657 A1 | 10/2014 | Johnson et al. |
| 2015/0009325 A1 | 1/2015 | Kardashov |
| 2015/0032305 A1 | 1/2015 | Lindeborg |
| 2015/0089427 A1 | 3/2015 | Akuzawa |
| 2015/0134146 A1 | 5/2015 | Pack et al. |
| 2015/0172545 A1 | 6/2015 | Szabo et al. |
| 2015/0276923 A1 | 10/2015 | Song et al. |
| 2015/0288891 A1 | 10/2015 | Johansson et al. |
| 2015/0294660 A1 | 10/2015 | Stokes et al. |
| 2015/0375837 A1 | 12/2015 | Johnson et al. |
| 2015/0378361 A1 | 12/2015 | Walker et al. |
| 2016/0041039 A1 | 2/2016 | Olsson |
| 2016/0069681 A1 | 3/2016 | Johnson et al. |
| 2016/0070265 A1 | 3/2016 | Liu et al. |
| 2016/0125739 A1 | 5/2016 | Stewart et al. |
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0334794 A1 | 7/2016 | Johnson et al. |
| 2016/0320190 A1* | 11/2016 | Wu ..................... G01C 23/005 |
| 2016/0370187 A1 | 12/2016 | Gatland et al. |
| 2017/0052029 A1 | 2/2017 | Ninomiya et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1 | 6/2017 | Johnson et al. |
| 2017/0184414 A1 | 6/2017 | Johsnon et al. |
| 2017/0205829 A1 | 7/2017 | Tyers |
| 2017/0227639 A1 | 8/2017 | Stokes et al. |
| 2017/0243360 A1 | 8/2017 | Schulte |
| 2017/0253314 A1* | 9/2017 | Ward ..................... B63H 25/42 |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2017/0371348 A1 | 12/2017 | Mou |
| 2018/0023954 A1 | 1/2018 | Rivers |
| 2018/0050772 A1 | 2/2018 | Koyano et al. |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 | 3/2019 | Shain et al. |
| 2019/0137618 A1 | 5/2019 | Hawker |
| 2019/0251356 A1 | 8/2019 | Rivers |
| 2019/0258258 A1 | 8/2019 | Tyers |
| 2019/0283855 A1 | 9/2019 | Nilsson |
| 2019/0299983 A1 | 10/2019 | Shalev-Shwartz et al. |

FOREIGN PATENT DOCUMENTS

| | | |
|---|---|---|
| DE | 11 2013 004908 | 6/2015 |
| EP | 1 775 212 | 4/2007 |
| EP | 1873052 | 1/2008 |
| EP | 3 182 155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| WO | 9305406 | 3/1993 |
| WO | 2006040785 | 4/2006 |
| WO | 2006 062416 | 6/2006 |
| WO | 2008 066422 | 6/2008 |
| WO | 2012010818 | 1/2012 |
| WO | 2017 095235 | 6/2017 |
| WO | 2017167905 | 10/2017 |
| WO | 2017168234 | 10/2017 |
| WO | 2017205829 | 11/2017 |
| WO | 2018162933 | 9/2018 |
| WO | 2018183777 | 10/2018 |
| WO | 2018201097 | 11/2018 |
| WO | 2018232376 | 12/2018 |
| WO | 2018232377 | 12/2018 |
| WO | 2019011451 | 1/2019 |
| WO | 2019096401 | 5/2019 |
| WO | 2019126755 | 6/2019 |
| WO | 2019157400 | 8/2019 |
| WO | 2019201945 | 10/2019 |

OTHER PUBLICATIONS

An Autonomous Solar-Powered Marine Robitic Ibservatory for Permanent Monitoring of Large Areas of Shallow Water by I. Gonzalez-Reolid et al.; Sensors 2018, 18(10), 3497; https://doi.org/10.3390/s18103497 (Year 2018).

S. Reed and V.E. Schmidt, "Providing Nautical Chart Awareness to Autonomous Surface Vessel operations," Oceans 2016 MTS/IEEE Monterery, 2016, pp. 1-8, doi: 10.1109/OCEANS.2016.7761472 (Year 2016).

(56) References Cited

OTHER PUBLICATIONS

European search report dated Mar. 31, 2020 in counterpart European Patent Application 19210025.3.
John Bayless, Adaptive Control of Joystick Steering in Recreational Boats, Marquette University, Aug. 2017, https://epublications.marquette.edu/cgi/viewcontent.cgi?article=1439&context=theses_open.

* cited by examiner

PROXIMITY SENSING SYSTEM AND METHOD FOR A MARINE VESSEL WITH AUTOMATED PROXIMITY SENSOR LOCATION ESTIMATION

CROSS-REFERENCE TO RELATED APPLICATIONS

This is a continuation of U.S. patent application Ser. No. 17/873,567, filed on Jul. 26, 2022, which is a continuation of U.S. patent application Ser. No. 16/674,889, filed Nov. 5, 2019, which application claims the benefit of priority to U.S. provisional Patent Application No. 62/770,499, filed on Nov. 21, 2018, all of which are hereby incorporated by reference in entirety.

FIELD

The present disclosure generally relates to systems and methods for proximity sensing on a marine vessel, and more specifically to proximity sensing systems and methods that automatically estimate proximity sensor location on a marine vessel and calibrate the system accordingly.

BACKGROUND

The following U.S. Patents are incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

In one embodiment, a system for proximity sensing on a marine vessel includes a main inertial measurement unit (IMU) positioned on the marine vessel at a main installation attitude and a main location, a first proximity sensor configured to measure proximity of objects from a first sensor location on the marine vessel, and a first sensor IMU positioned on the marine vessel at the first sensor location and at a first installation attitude. A sensor processor is configured to receive main IMU data from the main IMU and first IMU data from the first sensor IMU, wherein the main location of the main IMU on the marine vessel is known and at least one of the first sensor location and first installation attitude of the first sensor IMU on the marine vessel are initially unknown. The sensor processor determines a relative orientation transform between the main installation attitude and the first installation attitude by comparing the main IMU data and the first IMU data, and then determines a relative position transform between the main location and the first sensor location based on the relative orientation transform and comparison of the main IMU data and the first IMU data.

In one embodiment, a method of calibrating a proximity sensor on a marine vessel includes receiving, at a processor, main IMU data from a main inertial measurement unit (IMU) positioned on the marine vessel at a main installation attitude and a main location, and receiving first IMU data from a first sensor IMU co-located with a first proximity sensor at a first sensor location on the marine vessel and at a first installation attitude. The first proximity sensor is configured to measure proximity of objects from the first sensor location, wherein the main location of the main IMU on the marine vessel is known and at least one of the first sensor location and first installation attitude of the first sensor IMU on the marine vessel are initially unknown. A relative orientation transform is determined between the main installation attitude and the first installation attitude by comparing the main IMU data and the first IMU data, and a relative position transform is determined between the main location and the first sensor location based on the relative orientation transform and comparison of the main IMU data and the first IMU data.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
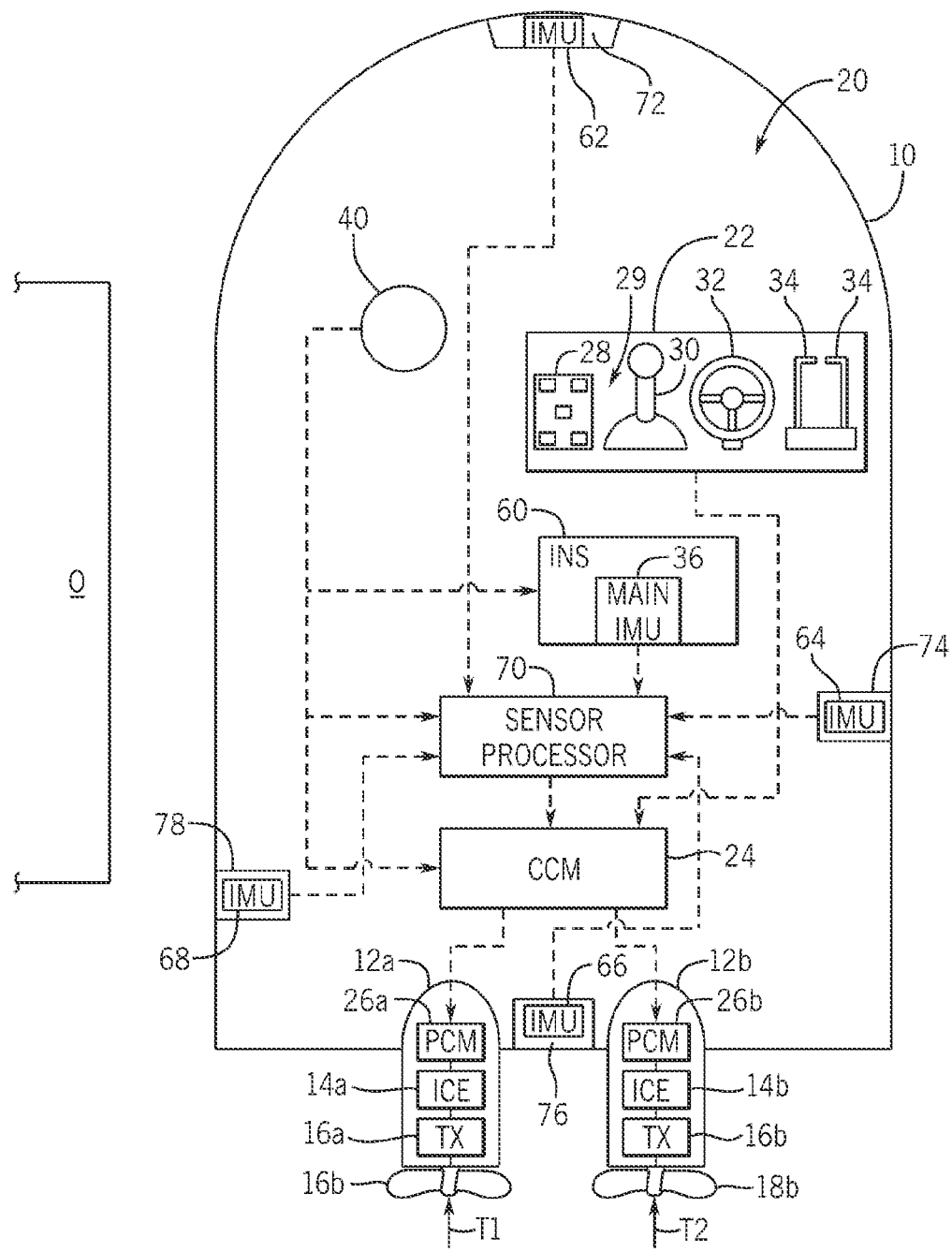
FIG. 1 is a schematic representation of an exemplary propulsion system on a marine vessel.

FIG. 1 shows a marine vessel 10 equipped with a propulsion system 20 on a marine vessel 10 configured according to one embodiment of the disclosure. The propulsion system 20 is capable of operating, for example, in a joysticking mode where a joystick is operated by a user to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the marine propulsion system 20. The marine propulsion system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory 25a and a programmable processor 25b. As is conventional, each control module 24, 26a, 26b includes a processor communicatively connected to a storage system comprising a computer-readable medium that includes volatile or non-volatile memory upon which computer-readable code and data are stored. The processor can access the computer-readable code and, upon executing the code, carries out functions, such as the navigation control functions and/or the proximity sensing calibration functions, as described in detail below.

The operation console 22 includes a number of user input devices, such as a keypad 28, a joystick 30, a steering wheel 32, and one or more throttle/shift levers 34. Each of these devices inputs commands to the controller 24. The controller 24, in turn, communicates control instructions to the first and second propulsion devices 12a, 12b by communicating with the PCMs 26a, 26b. The steering wheel 32 and the throttle/shift lever(s) 34 functions in a conventional manner, such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide signals to the controller 24. The joystick 30 can be used to allow the operator of the vessel 10 to manually maneuver the vessel 10, such as to achieve lateral translation or rotation of the vessel 10.

The propulsion system 20 also includes one or more proximity sensors 72, 74, 76, and 78. Although one proximity sensor is shown on each of the bow, stern, and port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. LIDARs or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 may provide this distance and/or direction information to one or more control modules, such as to the sensor processor 70 and/or the controller 24, such as by way of a dedicated bus connecting the sensors to a controller, a CAN bus, or wireless network transmissions, as described in more detail below.

Regarding the proximity sensors 72, 74, 76, 78, note that different types of sensors may be used depending on the distance between the vessel 10 and the object O. For example, radar sensors may be used to detect objects at further distances. Once the vessel 10 comes within a particular distance of the object, LIDAR, ultrasonic, LEDDAR, or sonar sensors may instead be used. Camera sensors may be used, alone or in combination with any of the sensors mentioned above, in order to provide object proximity information to the controller 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, LIDARs, LEDDARs, ultrasonics, and cameras) to sense the shortest distance and the direction of the object with respect to the vessel 10.

In certain embodiments, the sensor processor 70 may integrate all available sensor data from all sensor types into one or more maps or occupancy grids integrating all proximity measurement data. In such an embodiment, the proximity data from all of the various sensors needs to be translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel for operation in all marine environments. To create a cohesive dataset that can be used for purposes of vessel control and vessel navigation, including autonomous vessel navigation and automatic maneuver-limiting control, all of the data sources are translated to a common reference frame. This requires precise knowledge of the location and installation attitude, or orientation, of each sensor relative to the common reference frame such that the data measured therefrom can be translated appropriately. Regardless of whether a map or occupancy grid is created, the relevant sensor positions and installation attitudes of each sensor on the marine vessel must be known so that the proximity measurements from each respective sensor can be properly interpreted for navigation purposes.

Determination of the location and orientation of each sensor is a tedious process involving measurement of each sensor location from a defined location on a marine vessel and precise definition of the installation attitude of each installed sensor. This can be prohibitively expensive for boat builders and is a source of error and a potential failure point for vessel control systems. Some prior art systems have attempted to reduce proximity sensing installation costs by designing systems that include pre-determined sensor locations built into the vessel design, where each sensor incorporated in the system is pre-specified and must be installed precisely at a predetermined location and orientation. However, many boat builders find such systems to be overly constraining, especially given the variability of vessel configurations demanded by buyers. Moreover, such systems are error-prone because sensors are not always properly installed exactly to specifications.

In view of their recognition of the problems with current systems and challenges faced in the relevant industry, the inventors have developed the disclosed proximity sensing systems and methods, which are "plug-and-play" sensor systems that do not require laborious and exacting installation measurements, but also do not require a priori sensor configuration and specification and instead provide unlimited customization options to boat builders. The disclosed system provides flexibility for installing sensors in a variety of locations, where installation variability is automatically accounted for in an automated system configuration process.

The disclosed system and method utilize a main inertial measurement unit (IMU) installed at a known location on the marine vessel. Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data. The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of rotation and/or center of gravity of the vessel 10.

The disclosed system is configured to automatically locate each proximity sensor 72, 74, 76, 78 on the marine vessel 10 by relying on measurements from a co-located IMU with each proximity sensor 72-78. Namely, each proximity sensor 72, 74, 76, 78 has a respective IMU 62, 64, 66, 68 provided therewith at a known orientation relative to the view angle, or reporting frame, of the respective sensor 72-78. Each sensor IMU 62, 64, 66, 68 provides IMU data describing linear acceleration, angular acceleration, attitude, and/or heading. For example, each sensor IMU 62-68 may include a rate gyro, an accelerometer, and a magnetometer, and thus the IMU data provided may consist of rate gyro measurements, accelerometer measurements, and magnetometer measurements. Each sensor IMU 62-68 may be incorporated within the housing of each sensor device 72-78, or may be a separately-housed device located as close as possible to the respective proximity sensor 72-78 and installed at a known relative orientation thereto.

In one embodiment, the IMU data from each sensor IMU 62-68 is provided to a sensor processor 70. For example, the IMU data from each sensor IMU 62-68 may be transmitted along with the proximity measurements from the respective proximity sensor 72-78. In other embodiments, each sensor IMU 62-68 may have an integrated microprocessor configured to process the respective sensor IMU data and compute an attitude estimate for that IMU 62-68. In the embodiment shown in FIG. 1, the IMU data and proximity measurement data are communicated to the sensor processor 70, which may be via any wired or wireless communication means such as via a dedicated communication bus, wireless transmission protocols (e.g. Bluetooth, Bluetooth Low Energy, ZigBee, etc.), or a CAN bus comprising part of the vessel network. It should be noted that the dashed lines in FIG. 1 are meant to show only that the various control elements are capable of communicating with one another, and do not necessarily represent actual wiring connections between the control elements, nor do they represent the only paths of communication between the elements.

In the embodiment in FIG. 1, the sensor processing functions are performed by a separate computing device, where the sensor processor 70 communicates processed sensor data to the central controller 24, which utilizes the processed proximity data for navigation functions and/or other vessel control functions. The sensor processor 70 may be a dedicated, special-purpose computing system configured to process the proximity data and the IMU data from the proximity sensors 72-78 and sensor IMUs 62-68. Thus, the sensor processor 70 may include its own storage system comprising memory and its own processing system that executes programs and accesses data stored in the memory of the sensor processor 70. In other embodiments, the functions described herein as comprising part of the sensor processor functions may be incorporated in a multi-purpose controller, such as sensor processor software stored and executed within the controller 24. For example, the controller 24 may control marine vessel navigation, such as autonomous point-to-point navigation, automatic docking, or other advanced operator assistance programs. In certain embodiments, the central controller 24 may also perform the sensor processing functions. In still other embodiments, the functions described herein as comprising part of the sensor processor functions may be distributed across two or more processing devices, such as where each sensor IMU 62-68 has its own processor configured to perform calculations to interpret the measured IMU data (such as to determine an attitude estimate for the respective IMU as described below) and presents the interpreted IMU data to other processing devices or modules for execution of subsequent processing steps.

In one embodiment, the sensor processor 70 is programmed to automatically perform a sensor configuration process where it determines the installation location on the marine vessel and the installation attitude of each proximity sensor 72-78 without requiring such information to be inputted by an installer or performed in accordance with pre-set installation instructions. More specifically, the sensor processor 70 is configured to solve for the sensor location and sensor installation attitude of each sensor 72-78 based on the IMU data received from each sensor IMU 62-68. As described above, the installation location of the main IMU (herein referred to as the "main location") is known by the sensor processor 70. Such information may be known based on user input at the time of installation of the INS 60, for example, or may be assumed based on system specifications. In certain embodiments and the installation attitude of the main IMU (herein referred to as the "main installation attitude") may also be known, such as specified upon installation. Alternatively, the main installation attitude may be automatically determined during the automated system configuration process using similar algorithms as used to solve for the installation attitudes of the sensor IMUs 62-68, disclosed herein. Either way, the main installation attitude of the main IMU 36 is determined such that the attitude of the sensor IMUs 62-68 can eventually be calculated with respect to the main installation attitude of the main IMU 36.

The locations and installation attitudes of each sensor IMU 62-68, and thus each proximity sensor 72-78, may be initially unknown to the sensor processor 70 upon installation of the proximity sensing system. Thus, an installer may place the sensors 72-78 (and co-located IMUs 62-68) at any location on the marine vessel 10. The sensor processor 70 comprises software that automatically performs a system configuration whereby the locations and installation attitudes of each proximity sensor 72-78 are determined. Specifically, a relative orientation transform is determined that maps the installation attitude of each sensor 72-78 to the main installation attitude of the main IMU 36, and a relative position transform is determined mapping the sensor location of each proximity sensor 72-78 and sensor IMU 62-68 to the location of the main IMU 36 or to some other point on the marine vessel 10 with respect to which the relative position of the main IMU 36 is known. The relative position transform is determined based on the relative orientation transform and comparison of the first IMU data to the main IMU data. Thus, the locations of all sensors 72-78 and the main IMU 36 may be defined with respect to a particular point on the marine vessel (such as the center of gravity (COG) or center of rotation (COR)), which it may also be the point used for navigation calculations. Thereby, all proximity sensor locations are defined with respect to a common reference frame.

Figure 2A:
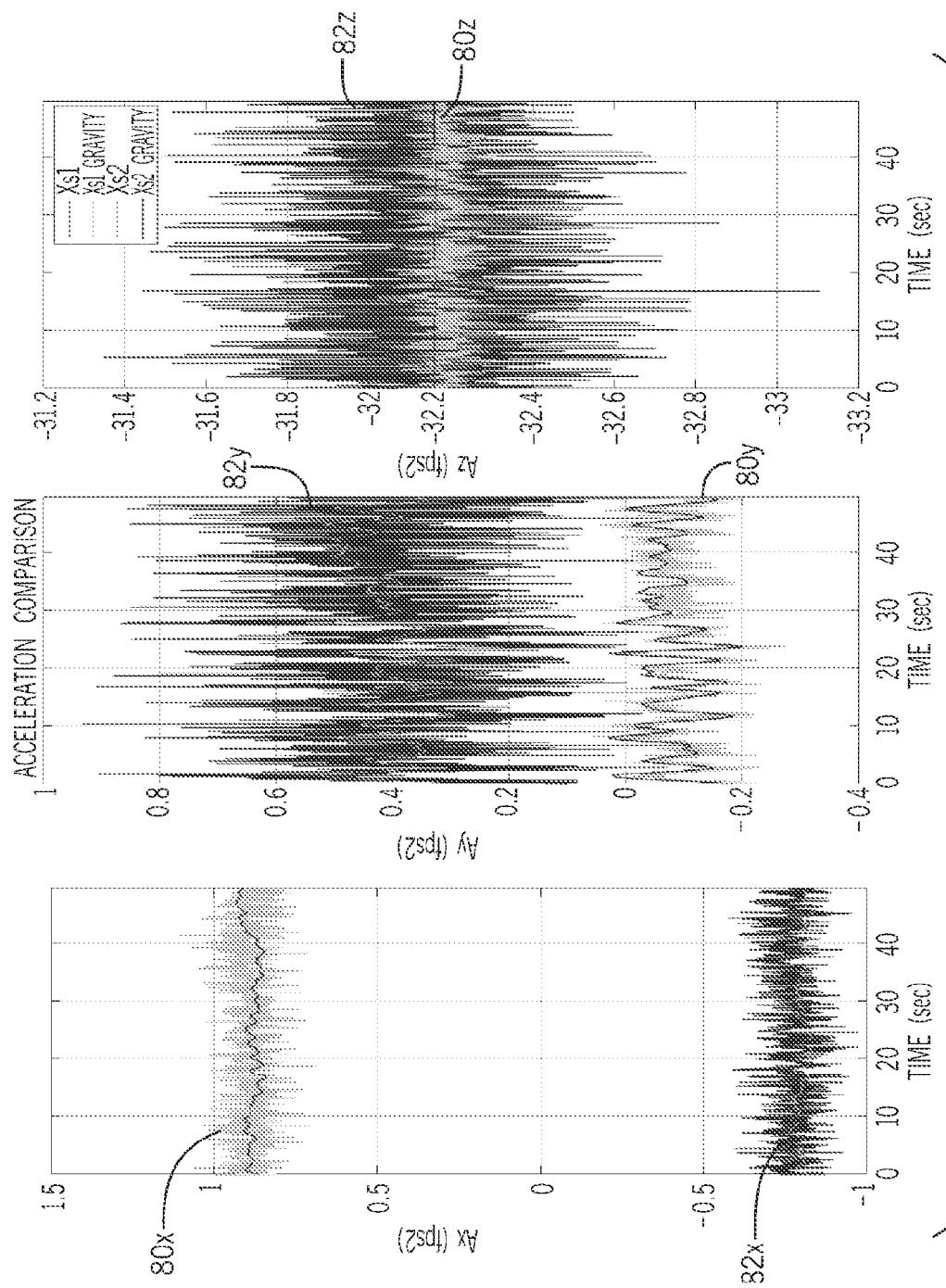
FIGS. 2A and 2B are graphs exemplifying IMU data from two IMUs positioned at different locations on a marine vessel.
Figure 2B:
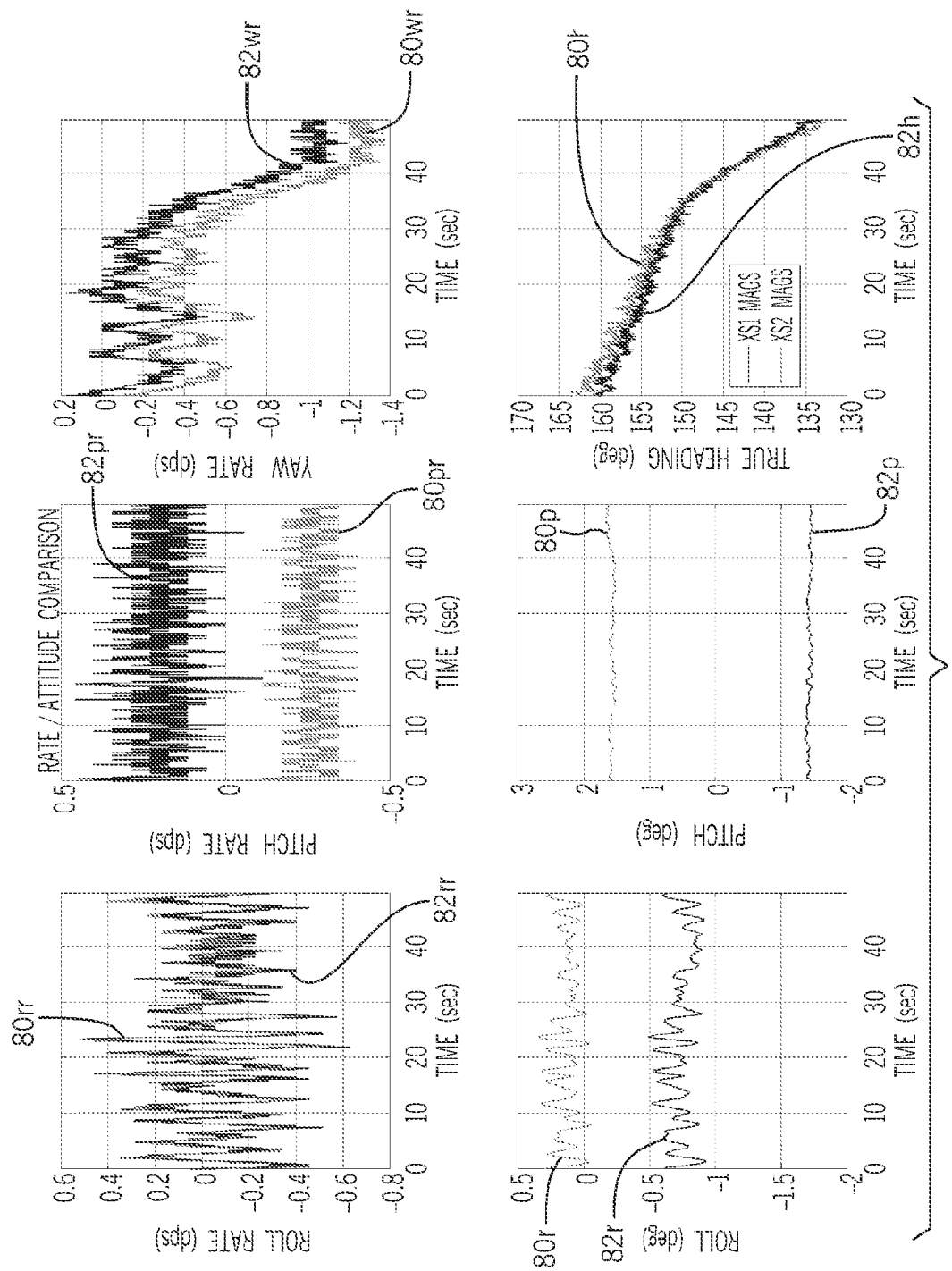

The graphs at FIGS. 2A and 2B depict IMU data from two different IMUs, where lines 80 in each graph represent IMU data from a main IMU 36 and lines 82 represent IMU data from a first sensor IMU (e.g., one of 62, 64, 66, or 68). The main IMU 36 producing IMU data 80 is positioned near the COG of the marine vessel 10 (e.g., on the floor of the marine vessel near the COG), and the first sensor IMU (e.g. 62) producing the first sensor IMU data 82 is positioned further away from the COG (e.g., on the hardtop). Accordingly, the peak accelerations reflected in the sensor IMU data 82 are higher than that for the main IMU data 80. The graphs of FIG. 2A depict acceleration data along three axes, including acceleration along the x-axis 80$x$ and 82$x$, acceleration along the y-axis 80$y$ and 82$y$, and acceleration in the z-direction 80$z$ and 82$z$. A mean filtered version of each of the acceleration datasets 80$x$-80$z$ and 82$x$-82$z$ is calculated, which is shown in each of the X, Y, and Z graphs. The mean acceleration data 80$x$-80$z$ and 82$x$-82$z$ is used to compute the installation attitude of the respective sensor IMU (e.g., 62), along with the rate and attitude data from the respective sensor. In certain embodiments, GPS data from the GPS 40 may also be used in conjunction with the sensor IMU data 82 to calculate the installation attitude, including the installation attitude and heading.

FIG. 2B depicts rate and attitude data from each sensor, including roll rate data 80$rr$ and 82$rr$, pitch rate data 80$pr$ and 82$pr$, and yaw rate data 80$wr$ and 82$wr$ from each of the main IMU 36 and a first sensor IMU 62. FIG. 2B further depicts roll, pitch, and heading measurements comprising part of the IMU data 80, 82 from each IMU 36, 62, including roll measurements 80$r$ and 82$r$, pitch measurements 80$p$ and 82p, and heading measurements 80h and 82h. As can be seen from the data, the different IMUs reflect the same vessel movement, where the roll, pitch, and yaw rates measured by each IMU 36 and 62 are approximately equal. However, the acceleration measured by the sensor IMU 62 mounted further from the COG is much higher than that measured by the main IMU 36. In one example, the main IMU 36 providing the main IMU data 80 is mounted on the floor near the COG of the vessel 10, where the first sensor IMU (e.g., 62-68) providing the sensor IMU data 82 is mounted away from the vessel COG, such as on the canopy of the marine vessel or on an outer edge of the marine vessel as shown in FIG. 1.

Figure 3:
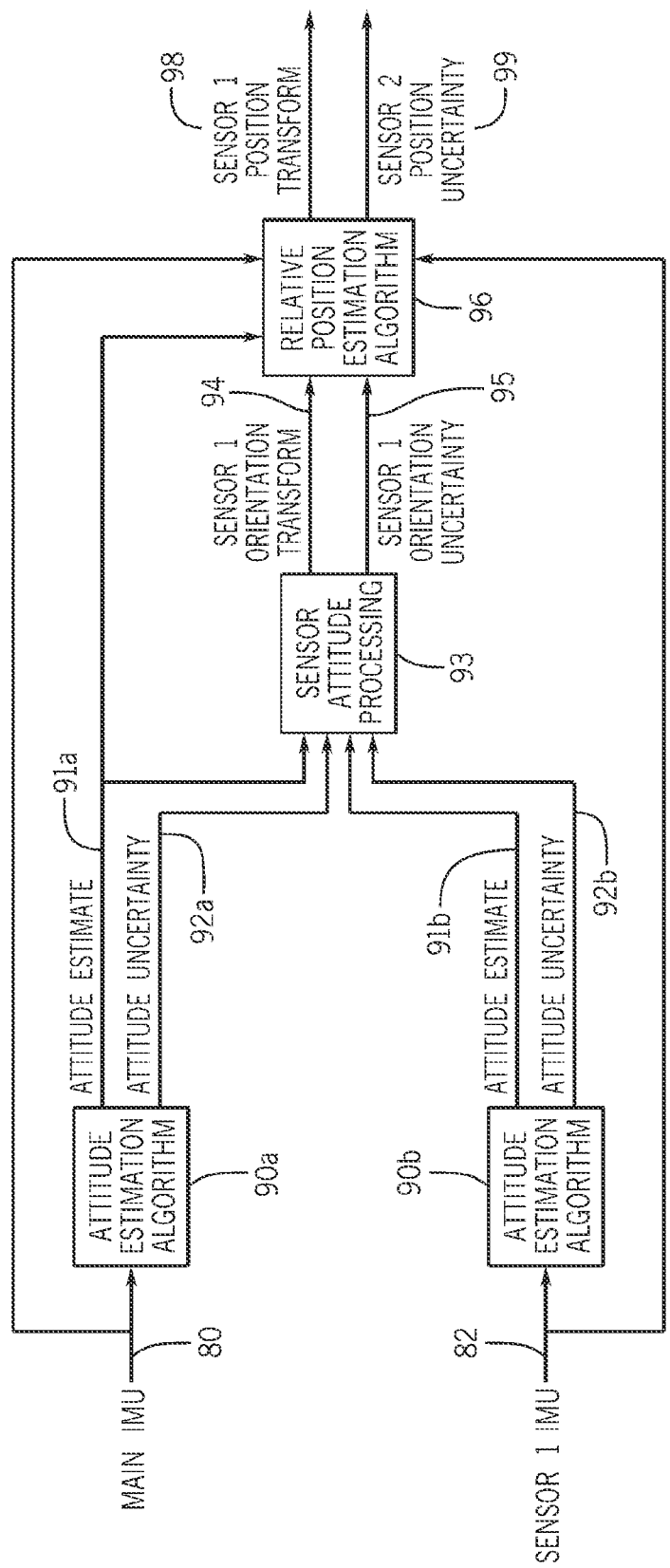
FIGS. 3 and 4 are flowcharts depicting exemplary methods, or portions thereof, of automated proximity sensor location estimation and system calibration.

The sensor processor 70 is configured to analyze the IMU datasets to estimate the installation attitude and sensor location of each proximity sensor 72-78 with respect to the main installation attitude of the main IMU 36. In one embodiment, the sensor processor 70 includes estimation algorithms that hone in on the installation attitude and sensor location of the first sensor (e.g. 62, 72) over time. For example, the estimation algorithms may implement estimation filtering over time, such as Kalman filtering (sometimes referred to as linear quadratic estimation), to produce increasingly accurate estimates of the installation attitude and sensor location, which are unknown variables to the sensor processor 70 prior to the calibration procedure. Referring to FIG. 3, the sensor processor 70 is configured to apply an attitude estimation algorithm 90a, 90b to the main IMU data 80 and the sensor IMU data 82, respectively, to estimate an attitude of the respective IMUs 36, 62 relative to the Earth's horizon—i.e., main attitude estimate 91a and sensor attitude estimate 91b may be Euler angles describing the attitude of the respective IMUs 36, 62. For example, the attitude estimation algorithm may utilize a filter estimator, such as a Kalman filter, to solve for the attitude of each IMU 36, 62 based on the composite acceleration vector relative to gravity, the rate gyro measurements, and the magnetic heading measurements of the respective IMU data 80, 82. In certain embodiments, the attitude estimation algorithm 90a, 90b estimating the attitude of the IMU 36, 62 may also receive other information from the INS 60, such as GPS data, in order to solve for the attitude of that IMU 36, 62.

From there, the main attitude estimate 91a and the sensor attitude estimate 91b are provided to a sensor attitude processing algorithm 93 that calculates a relative orientation transform 94 for that first sensor IMU 62 based on a difference between the first installation attitude of the first sensor IMU 62 and the main installation attitude of the main IMU 36. For example, the sensor orientation transform 94 may be calculated to describe the attitude of the respective sensor IMU 62-68 with respect to the Earth's horizon, which may be equated to a plane of the boat (e.g., defined as the plane parallel to the keel and the transom). Such calculation is a difference between sensor attitude estimate 91b and the main attitude estimate 91a adjusted for the known main installation attitude.

The estimator filters or attitude estimation algorithms 90a and 90b may also generate an uncertainty value for the estimated attitude of the respective IMUs 36, 62. Namely, the attitude estimation algorithm 90a may output a main attitude uncertainty value 92a describing the uncertainty of the main attitude estimate 91a, and the attitude estimation algorithm 90b may output a sensor attitude uncertainty value 92b describing the uncertainty of the sensor attitude estimate 91b for the first sensor IMU 62. The uncertainty value is expected to decrease over time as the filter converges on a more accurate estimate for the attitude—e.g. as the system effectively identifies and eliminates noisy sensor data and other random external factors. The time to convergence may vary depending on, for example, the amount of noise in the measurement data and the amount of vessel motion that occurs during the calibration measurements. The time to convergence may increase in situations where the IMU data 80, 82 is especially noisy or where the marine vessel 10 is very still. A lack of motion of the marine vessel can deprive the filter estimator of the data needed to make accurate comparisons and calculations of the unknown variables, thus increasing the time to convergence for the estimated attitudes 91a, 91b.

In certain embodiments, an uncertainty value may also be generated for the relative orientation transform 94. The sensor attitude processing algorithm 93 may generate a sensor orientation uncertainty value 95 calculated based on the uncertainty values 92a, 92b for the estimated attitudes of the IMUs 36, 62. For example, the orientation uncertainty value 95 may be the root-mean-square of the uncertainty values 92a, 92b.

A relative position transform 98 for the first sensor IMU 62 is then calculated using the relative orientation transform 94, as well as the main IMU data 80 and the sensor IMU data 82 as input to a relative position estimation algorithm 96. The relative position estimation algorithm 96 includes another filter estimator to compute an estimated first sensor location. For example, a Kalman filter may be utilized to estimate the first sensor location relative to the main location of the main IMU 36 based on the estimated first installation attitude, the vessel attitude (e.g. attitude measurements from the main IMU 36), the main IMU data 80, and the first sensor IMU data 82. Specifically, the Kalman filter estimator may utilize the rate gyro measurements and the accelerometer measurements from the respective IMU datasets 80, 82. For example, the governing equation for the position estimation by the relative estimation algorithm may be provided by the following:

$$A_{sensor} = A_{main} - [\dot{\omega} \times r] - [\omega \times \omega \times r]$$

where $A_{sensor}$ is the vector of the three-body frame linear accelerations at the sensor in question (e.g., the first sensor IMU 62), $A_{main}$ is the vector of the three-body frame linear accelerations measured by the main IMU, $\omega$ is the vector of three-body axis rotation rates, $\dot{\omega}$ is the derivative of the rotation rates along each axis, and r is the vector of three cartesian (x, y, z) position offsets between the location of sensor in question (e.g., the first sensor IMU 62) and the location of the main IMU 36. Accordingly, this is a three-dimensional equation where the r values in each of the x, y, and z directions are unknown and can be solved for. The sensor orientation transform 94 derived at the first portion of the calibration is utilized to rotate the acceleration vector $A_{sensor}$ for the first sensor IMU 62 to be in the same reference frame as the acceleration vector $A_{main}$ of the main IMU 36. Then, since the devices are attached to the same vessel, which is a rigid body, $\omega$ and $\dot{\omega}$ (the derivative of the measured $\omega$) should be the same. Thus r, representing the position of the first sensor IMU 62 relative to the position of the main IMU 36, can be solved for.

This solution will be provided by the filter estimator, such as a Kalman filter, which will converge on an accurate estimated sensor location value over time. The filter estimator may generate an uncertainty value for the estimated first sensor location, the sensor position uncertainty 99, which will decrease as the estimator filter converges on the correct r value over some period of time. The sensor position uncertainty 99 is based on the sensor orientation uncertainty, as well as the attitude uncertainties 92a, 92b. Thus, as described below, the system may be configured to first minimize those uncertainties before calculating the sensor position transform 98. As described above, this period of time for convergence may be situationally-dependent, such as based on the water conditions and noise in the system. For example, convergence may be reached when the sensor position 99 reaches a minimized uncertainty threshold, which is a pre-set threshold at which point the estimated position value can be considered reliable. Upon reaching the minimized uncertainty threshold, the estimated first installation attitude and estimated first sensor location may be stored, such as in memory of the sensor processor 70 for future use by the system 20. The same process is applied for each sensor IMU (e.g., 62-68) within the system 20 so that the installation attitude and the location of each can be determined.

In certain embodiments, the sensor processor 70 may continue to compare the main IMU data 80 and the sensor IMU data 82 and calculate the estimated first installation attitude and estimated first sensor location, along with the respective uncertainty values, in order to verify that the sensor calibration remains accurate. For example, if a sensor is moved or rotated such that the location or attitude changes, then the uncertainty value will increase and the system 20 can act accordingly until the estimated sensor installation attitude and/or sensor location determination is accurate again (i.e., the uncertainty value is less than the minimized uncertainty threshold).

In certain embodiments, the navigation algorithm, such as executed at the controller 24, may weight the proximity data from the respective sensor 72-78 according to the uncertainty value when the uncertainty value is greater than the minimized uncertainty threshold. In other embodiments, a fault condition may be generated when the uncertainty value is less than the minimized uncertainty threshold and the navigation controller may be configured to not operate in an autonomous or semi-autonomous mode until removal of the fault condition (i.e., the uncertainty value is greater than the minimized uncertainty threshold).

In various embodiments, the sensor processor 70 may be configured to adjust the proximity measurements from each proximity sensor 72-78 based on the relative orientation transform and the relative position transform for the respective sensor in order to present all of the proximity measurements in the same coordinate system. Thereby, proximity measurements from all sensors can be presented in a common coordinate frame and easily correlated for making navigation determinations. Given that the relative orientation is known between each proximity sensor 72-78 field of view and the installation attitude of the corresponding sensor IMU 62-68, the proximity measurements from all of the sensors can be adjusted to a common coordinate frame. Where the sensor processor 70 is separate from the navigation controller, such as central controller 24, the adjusted proximity measurements may be communicated to the navigation controller for use in navigation. In certain examples, the adjusted proximity measurements may be transmitted via a dedicated bus, a wireless transmission protocol, or via a CAN bus comprising part of the vessel network. The adjusted proximity measurements may be similarly communicated to other control elements within the system 20, as necessary.

Figure 4:
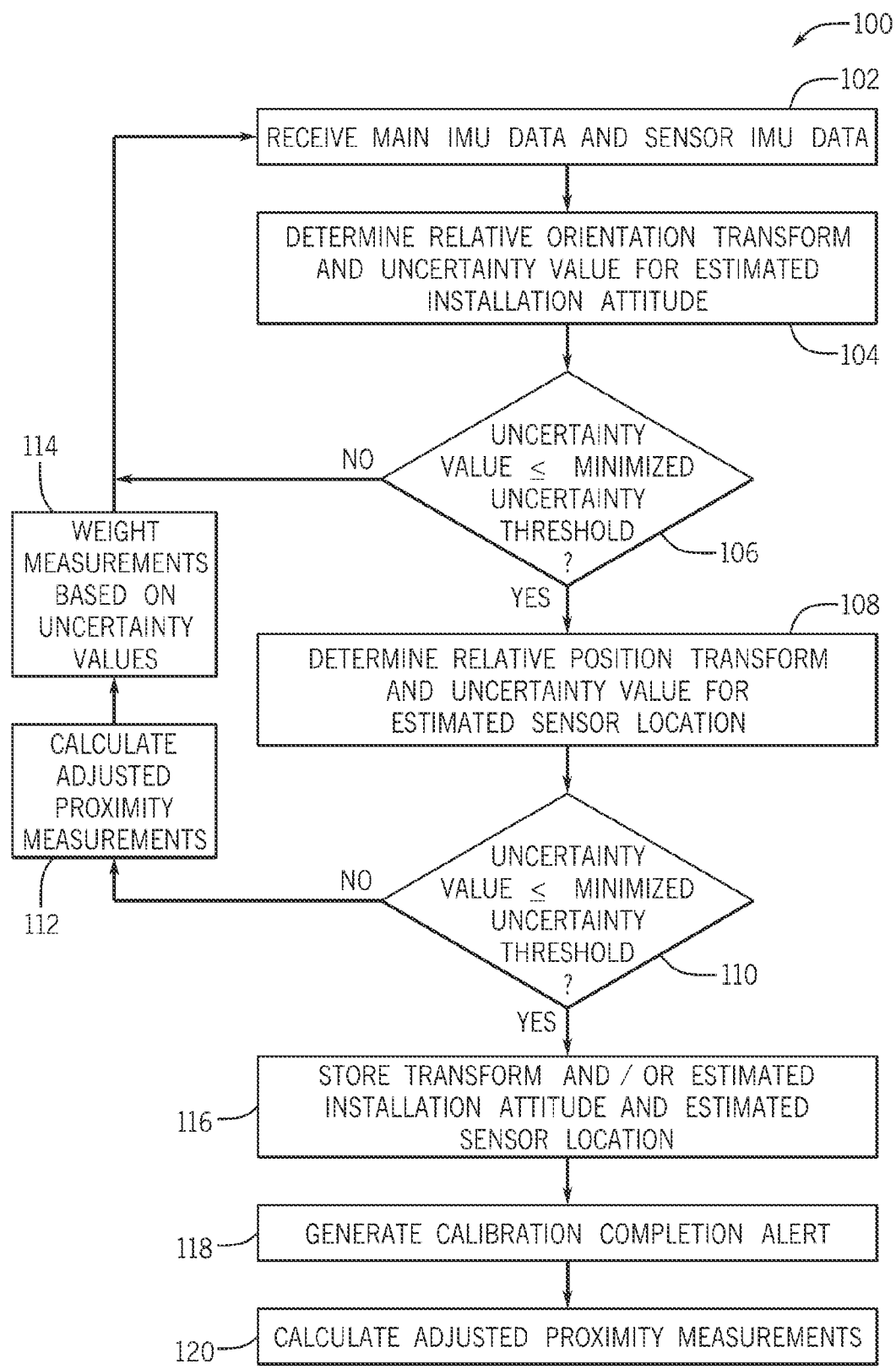

FIG. 4 also depicts an embodiment of a method 100 of operating a proximity sensing system, including calibration procedures to determine the location and installation attitude of each proximity sensor (e.g. 72-78). The main IMU data 80 and each sensor IMU data (e.g., 82) is received at step 102. The above-described procedures are performed for each proximity sensor based on the respective sensor IMU data to solve for the installation attitude of each sensor (other than the main IMU 36) at step 104. An uncertainty value is also generated for the estimated installation attitude. Instructions are executed at step 106 to compare the uncertainty value to a minimized uncertainty threshold. The attitude estimation algorithm continues to be executed based on continually-received IMU data from the relevant sensor IMU 62-68 until the uncertainty value reaches the minimized uncertainty threshold.

Instructions are then executed as represented at step 108 to determine the relative position transform and uncertainty value for the estimated sensor location. In the depicted example, the relevant proximity measurements are weighted according to the uncertainty value until the uncertainty value reaches the minimized uncertainty threshold. Namely, the adjusted proximity measurements may be calculated at step 112 based on the relative position transform and the relative orientation transform, and then the adjusted proximity measurements may be weighted based on the uncertainty value, as represented at step 114. Thus, where the sensor processor has not yet converged on reliable installation attitude and location estimations for certain sensors 72-78, the data from those sensors may be weighted less heavily in the navigation algorithm. In other embodiments, the system 20 may be configured to wait until all sensors are calibrated (i.e., all uncertainty values are less than the minimized uncertainty threshold) before activating any autonomous or semi-autonomous navigation functions.

In certain embodiments, the system may be configured to track the amount of time spent on calibration and to only allow a maximum time for the calibration process prior to generating a fault action and/or fault alert if the sensor position uncertainty 99 (and thus also the sensor orientation uncertainty 95) does not reach the minimized uncertainty threshold (step 110) within the maximum allotted time. In certain embodiments, the system may also be configured to identify the error path. For example, the system may be configured to determine whether the problematic sensor IMU is too close to the main IMU, and thus insufficient data is available for sufficiently accurate resolution of the sensor position transform 98 (i.e., the "r" vector of three cartesian (x,y,z) position offsets is too small to be accurately resolved). Alternatively or additionally, the system may be configured to determine whether the problematic sensor IMU is too noisy, or whether insufficient acceleration data is available (i.e., the vessel is too still).

Once the uncertainty value for the estimated sensor location reaches the minimized uncertainty threshold at step 110, then the relative position transform and the relative orientation transform and/or the estimated installation attitude and the estimated sensor location may be stored at step 116, such as in memory of the sensor processor 70. Thereby, the values can be later utilized for calculation of the adjusted proximity measurements from each sensor, so as to reduce processing demand on the sensor processor 70. In certain embodiments described above, the estimation algorithms may continually run, or selectively run, in order to verify that the calibration is still correct and that the uncertainty values are still below the minimized uncertainty thresholds.

Once the uncertainty values reach the minimized uncertainty threshold, a calibration completion alert is generated at step 118 to alert the user/installer that the calibration is complete and the proximity measurements being utilized by the navigation system are properly calibrated and reliable.

Adjusted proximity measurements are then calculated at step 120 using the calibrated values so that all of the proximity measurements by the various sensors are provided on a common coordinate frame. In certain embodiments, the sensor processor 70 may communicate only the adjusted proximity measurements to the navigation controller, such as the CCM 24.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A proximity sensing system on a marine vessel, the system comprising:
   a main inertial measurement unit (IMU) positioned on the marine vessel at a main installation attitude and a main location;
   a first proximity sensor configured to measure proximity of objects from a first sensor location on the marine vessel;
   a first sensor IMU positioned on the marine vessel at the first sensor location and at a first installation attitude;
   a control system configured to:
      receive main IMU data from the main IMU and first IMU data from the first sensor IMU, wherein the main location of the main IMU on the marine vessel is known and at least one of the first sensor location and the first installation attitude of the first sensor IMU on the marine vessel are initially unknown;
      calibrate the proximity measurements from the first proximity sensor based on the main IMU data and the first IMU data; and
      adjust subsequently measured proximity measurements from the first proximity sensor based on the calibration.

2. The system of claim 1, wherein the control system is further configured to control propulsion of the marine vessel based on the adjusted proximity measurements.

3. The system of claim 1, wherein the control system is further configured to generate a display based on the adjusted proximity measurements.

4. The system of claim 1, wherein the control system is further configured to:
   determine a relative orientation transform between the main installation attitude and the first installation attitude by comparing the main IMU data and the first IMU data;
   determine a relative position transform between the main location and the first sensor location based on the relative orientation transform and comparison of the main IMU data and the first IMU data; and
   wherein adjusting adjust proximity measurements from the first proximity sensor based on the calibration includes adjusting proximity measurements from the first proximity sensor based on the relative orientation transform and/or the relative position transform, wherein a relative orientation between the first proximity sensor and the first sensor IMU is known.

5. The system of claim 1, wherein the control system is further configured to:
   generate an estimated first installation attitude of the first sensor IMU based on the first IMU data;
   determine a relative orientation transform based on the main IMU data and the first IMU data, wherein the relative orientation transform is based on a difference between the estimated first installation attitude and the main installation attitude.

6. The system of claim 5, wherein the control system is further configured to determine an uncertainty value for the estimated first installation attitude and to store the relative orientation transform once the uncertainty value for the estimated first installation attitude reaches a minimized uncertainty threshold.

7. The system of claim 5, wherein the control system is further configured to determine an estimated first sensor location based on the estimated first installation attitude and determine an uncertainty value for the estimated first sensor location, wherein a calibration completion alert is generated once the uncertainty value for the estimated first sensor location reaches a minimized uncertainty threshold.

8. The system of claim 7, wherein the control system is further configured to determine an uncertainty value for the estimated first installation attitude and to store the relative orientation transform once the uncertainty value for the estimated first installation attitude reaches a minimized uncertainty threshold, and wherein the uncertainty value for the estimated first sensor location is further based on the uncertainty value for the estimated first installation attitude.

9. The system of claim 8, wherein the control system is further configured to output a calibration completion alert once the uncertainty value for the estimated first sensor location reaches the minimized uncertainty threshold.

10. The system of claim 1, wherein the control system is configured to generate a calibration completion alert prior to adjusting proximity measurements from the first proximity sensor based on the calibration, wherein the calibration completion alert indicates that a calibration threshold is met.

11. A method of calibrating a proximity sensor on a marine vessel, the method comprising:
    receiving, at a processor, main IMU data from a main inertial measurement unit (IMU) positioned on the marine vessel at a main installation attitude and a main location;
    receiving, at the processor, first IMU data from a first sensor IMU co-located with a first proximity sensor at a first sensor location on the marine vessel and at a first installation attitude, wherein the first proximity sensor is configured to measure proximity of objects from the first sensor location;
    wherein the main location of the main IMU on the marine vessel is known and at least one of the first sensor location and the first installation attitude of the first sensor IMU on the marine vessel are initially unknown;
    calibrating the proximity measurements from the first proximity sensor based on the main IMU data and the first IMU data; and
    adjusting subsequently measured proximity measurements from the first proximity sensor based on the calibration.

12. The method of claim 11, further comprising controlling propulsion of the marine vessel based on the adjusted proximity measurements.

13. The method of claim 11, further comprising generating a calibration completion alert prior to controlling propulsion based on the calibration, wherein the calibration completion alert indicates that a calibration threshold is met.

14. The method of claim 11, wherein the step of calibrating includes determining, with the processor, a relative orientation transform between the main installation attitude and the first installation attitude by comparing the main IMU data and the first IMU data; and determining, with the processor, a relative position transform between the main location and the first sensor location based on the relative orientation transform and comparison of the main IMU data and the first IMU data.

15. The method of claim 14, wherein the subsequently measured proximity measurements from the first proximity sensor are adjusted based on the relative position transform and the relative orientation transform.

16. The method of claim 14, wherein a relative orientation between the first proximity sensor and the first sensor IMU is known.

17. The method of claim 14, further comprising estimating the first installation attitude of the first sensor IMU based on the first IMU data and determining the relative orientation transform based on the estimated first installation attitude, wherein the relative orientation transform is based on a difference between the estimated first installation attitude and the main installation attitude.

18. The method of claim 17, wherein the main installation attitude of the main IMU on the marine vessel is known.

19. The method of claim 17, further comprising estimating the main installation attitude of the main IMU based on the main IMU data, wherein the relative orientation transform is based on a difference between the estimated first installation attitude and the estimated main installation attitude.

20. The method of claim 12, further comprising generating a calibration completion alert once an uncertainty value for an estimated first installation attitude and an uncertainty value for an estimated first sensor location have each reached a respective minimized uncertainty threshold.

* * * * *